G. CROSBY.
ELECTRICAL SYSTEM OF DISTRIBUTION.
APPLICATION FILED MAY 12, 1916.

1,241,485.

Patented Sept. 25, 1917.

Inventor
Gorham Crosby
By his Attorneys
Kenyon & Kenyon

UNITED STATES PATENT OFFICE.

GORHAM CROSBY, OF GLEN RIDGE, NEW JERSEY, ASSIGNOR TO GOULD COUPLER COMPANY, A CORPORATION OF NEW YORK.

ELECTRICAL SYSTEM OF DISTRIBUTION.

1,241,485.  Specification of Letters Patent.  Patented Sept. 25, 1917.

Application filed May 12, 1916. Serial No. 96,986.

*To all whom it may concern:*

Be it known that I, GORHAM CROSBY, a citizen of the United States, and a resident of Glen Ridge, county of Essex, State of New Jersey, have invented certain new and useful Improvements in Electrical Systems of Distribution, of which the following is a specification.

The invention relates to improvements in electrical systems of distribution and more particularly to systems in which the generator is driven at variable speed, is adapted to charge a storage battery, and, if desired, simultaneously supply translating devices. The main object of the invention is to render more efficient and effective such a system, in which the generator voltage is suitably regulated, and resistance is applied in the circuit of the battery to regulate the charging current. More specific objects, features and advantages will more clearly appear from the detailed description given below, taken in connection with the accompanying drawings, which form a part of this specification.

Figure 1:
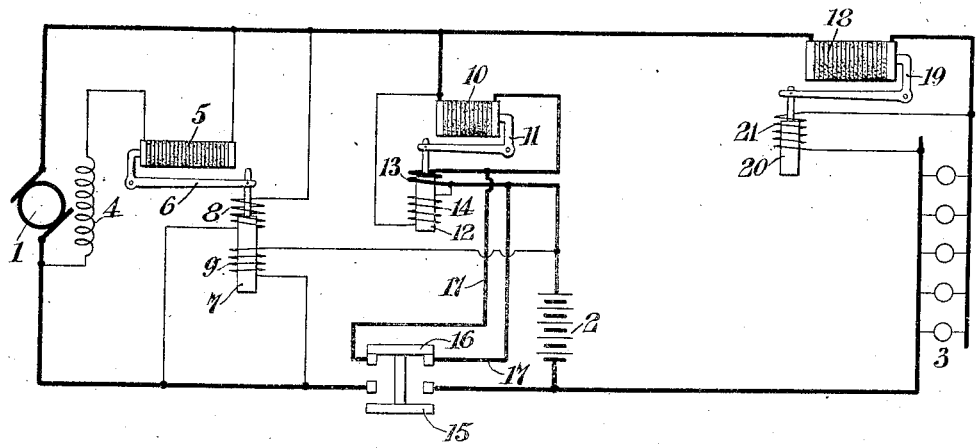
Figure 2:
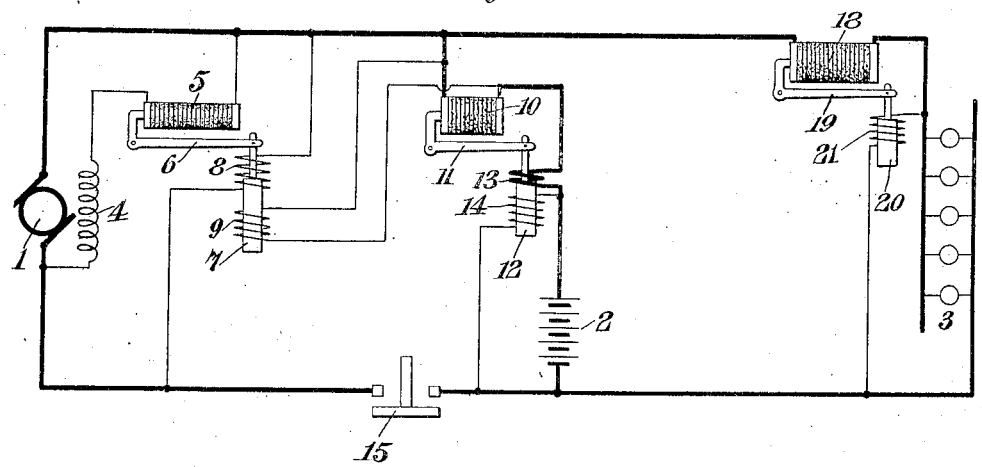

In the drawings, Figure 1 is a diagram illustrating a system embodying the improvements in one form. Fig. 2 is a diagram showing a modification.

Referring to Fig. 1, 1 represents a main generator, 2 represents a storage battery, and 3 the lamps or other translating devices adapted to be supplied from the generator 1. 4 represents a shunt field winding of the generator and 5 a carbon pile rheostat in series therewith, operated by a lever 6 carrying a core 7, controlled by a voltage coil 8 connected across the generator, and a voltage coil 9 connected across the battery, the coil 9 being wound to oppose the coil 8. In series with the battery in the battery circuit is a carbon pile variable resistance 10, controlled by a lever 11, carrying a core 12, controlled by a current coil 13 in the battery circuit and a voltage coil 14 connected across the carbon pile 10 and coil 13, so as to be responsive to changes in drop in potential in the carbon pile 10. 15 represents an automatic main switch of any suitable or well-known kind, adapted to connect the generator to the storage battery and translating devices, when the generator has attained sufficient speed. The main switch is provided with a back contact 16, adapted to close the shunt circuit 17 when the main switch opens, to shunt the coil 13. 18 represents a carbon pile rheostat in circuit with the translating devices, operated by a lever 19, having a core 20, controlled by a voltage coil 21 connected across the translating devices, to regulate the voltage applied to the translating devices.

During the normal charge of the battery, the battery back pressure remains substantially constant; and the voltage of the generator is maintained substantially constant by the action of the voltage coil 8 on the regulating means 5. Should the voltage tend to increase, due to an increase in speed, coil 8, acting through the core 7 and lever 6, will increase the resistance of the carbon pile 5 and so weaken the generator field, to maintain the voltage substantially constant. The charging current flowing to the battery is maintained substantially constant by the action of the coil 13 on the core 12, lever 11 and carbon pile 10. When the battery current tends to increase, coil 13 will increase the resistance of pile 10 in circuit with the battery and so decrease the battery current, to maintain it substantially constant. When the battery becomes substantially charged, as indicated by a relatively rapid rise in the back pressure, the charging current will tend to decrease, causing a weakening of the coil 13, a decrease in the resistance of the carbon pile 10, and consequently, a decrease in the voltage drop thereacross. This will decrease the strength of the opposing coil 14, which will thereby tend to make coil 13 more effective and tend to increase the resistance of carbon pile 10, causing a further decrease in battery charging current. In this way the battery charging current is more rapidly tapered off at the end of the charge.

At the beginning of the charging, when the battery is in a discharged condition, and its back pressure relatively low, the strength of the voltage coil 9 will be considerably less than normal, and hence it will oppose the voltage coil 8 to a less degree. This will enable the coil 8 to maintain the generator voltage at a less value, so that, under these conditions, less resistance is required in the battery circuit to limit the battery current to the desired value, and consequently, less energy is lost in the variable resistances 10 and 18.

If desired, coil 9 may be connected across the carbon pile 10 and wound to aid the coil 8 instead of opposing it. This modification is illustrated in Fig. 2. In such case, when the battery is in a discharged condition, and resistance 10 is increased to limit the battery charging current, the strength of coil 9 will be increased and so aid coil 8 to reduce the generator voltage to a value below normal. Likewise, as shown in Fig. 2, voltage coil 14 may be connected across the battery and wound to aid the current coil 13. In such case, as the voltage across the battery rises at the end of the charge, coil 14 will increase in strength and enable the coil 13 to limit the battery current at a lesser value, thus more rapidly decreasing the battery charging current.

Many changes and modifications may be made without departing from the spirit and scope of the invention in its broader aspects, including those illustrated in my co-pending application, Serial No. 96,291 filed May 9th 1916, and it is desired to cover all systems coming within the language of the appended claims. I do not, however, make any claim herein to the employment of a voltage controlled generator regulator in combination with a regulator for varying the resistance of battery circuit, except as such generator regulation is modified by such a coil as the coil 9, or except as such resistance variations in the battery circuit are modified by such coils as the coil 14, as I am making claims to such broader invention in my said pending application Sr. No. 96291.

What is claimed and desired to secure by Letters Patent is:

1. An electrical system of distribution having in combination a variable speed generator, a storage battery connected to be supplied thereby, means regulating the generator voltage, a voltage coil controlling said means, means for changing the resistance in circuit with the battery to regulate the battery charging current, and a coil affecting said regulating means and acting to cause a decrease in generator voltage when the battery is in a discharged condition.

2. An electrical system of distribution having in combination a variable speed generator, a storage battery connected to be supplied thereby, means regulating the generator voltage, a voltage coil controlling said means, means for changing the resistance in circuit with the battery to regulate the battery charging current, and a coil affecting said regulating means and acting to cause a decrease in generator voltage when the battery is in a discharged condition, said last mentioned coil being responsive to changes in the battery back pressure.

3. An electrical system of distribution having in combination a variable speed generator, a storage battery connected to be supplied thereby, means regulating the generator voltage, a voltage coil controlling said means, means for changing the resistance in circuit with the battery to regulate the battery charging current, a current coil controlling said resistance changing means and a coil affecting said resistance changing means and acting to tend to weaken the battery charging current as the battery becomes charged.

4. An electrical system of distribution having in combination a variable speed generator, a storage battery connected to be supplied thereby, means regulating the generator voltage, a voltage coil controlling said means, means for changing the resistance in circuit with the battery to regulate the battery charging current, a current coil controlling said resistance changing means and a coil affecting said resistance changing means and acting to tend to weaken the battery charging current as the battery becomes charged, said last mentioned coil being responsive to changes in voltage drops across the resistance in circuit with the battery.

5. An electrical system of distribution having in combination a generator, a storage battery and translating devices connected to be supplied thereby in parallel, means for regulating the voltage upon the translating devices, means for regulating the generator voltage, a voltage coil controlling said last mentioned means, a coil affecting said last mentioned means and acting to cause a decrease in generator voltage when the battery is in a discharged condition, means for changing the resistance in the battery circuit to regulate the battery charging current, a current coil controlling said resistance changing means and a coil affecting said resistance changing means and acting to tend to weaken the battery charging current as the battery becomes charged.

6. An electrical system of distribution having in combination a generator, a storage battery and translating devices connected to be supplied thereby in parallel, means for regulating the voltage upon the translating devices, means for regulating the generator voltage, a voltage coil controlling said last mentioned means, a coil connected across the battery and opposing said voltage coil for affecting said last mentioned means and acting to cause a decrease in generator voltage when the battery is in a discharged condition, means for changing the resistance in the battery circuit to regulate the battery charging current, a current coil controlling said resistance changing means and a coil affecting said resistance changing means and acting to tend to weaken the battery charging current as the battery becomes charged, said last mentioned coil being connected across the resistance in the battery circuit and wound to oppose said current coil.

In testimony whereof, I have signed my name to this specification.

GORHAM CROSBY.